United States Patent
Leisner et al.

(10) Patent No.: US 6,621,596 B1
(45) Date of Patent: Sep. 16, 2003

(54) LIMITING DECOMPOSITION TIME ON A PER PAGE BASIS FOR OUTPUT DEVICES

(75) Inventors: Martin A. Leisner, Rochester, NY (US); Randall P. Cole, Victor, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/337,850

(22) Filed: Jun. 21, 1999

(51) Int. Cl.[7] .......................... G06F 15/00; H04N 1/00; H04N 1/40
(52) U.S. Cl. .................. 358/109; 358/1.9; 358/401; 358/406; 358/448
(58) Field of Search .................. 358/1.1, 1–12, 358/5; 709/5

(56) References Cited

U.S. PATENT DOCUMENTS

| | | | |
|---|---|---|---|
| 3,739,350 A | * | 6/1973 | Moran |
| 5,274,461 A | * | 12/1993 | Mitsuhashi ............ 358/296 |
| 5,337,258 A | * | 8/1994 | Dennis .............. 364/551.01 |
| 5,406,383 A | * | 4/1995 | Tanaka ..................... 358/401 |
| 5,781,707 A | * | 7/1998 | Kunz et al. ............... 395/105 |
| 6,192,206 B1 | * | 2/2001 | Peters et al. .............. 399/77 |

* cited by examiner

*Primary Examiner*—Edward Coles
*Assistant Examiner*—Saeid Ebrahimi
(74) *Attorney, Agent, or Firm*—Fay, Sharpe, Fagan, Minnich & McKee, LLP

(57) ABSTRACT

An operator of a printer may choose a maximum decomposition time for a page of a print job. Each page in the print job must fully decompose before the maximum decomposition time is reached. If a page does not fully decompose before the maximum decomposition time is reached, the print job may be terminated. In addition, a notification may be generated advising the operator that a page of the print job did not fully compose before the maximum decomposition time was reached. The establishment of maximum decomposition times helps to ensure that a single print job does not monopolize a printer or other output device.

20 Claims, 8 Drawing Sheets

LIMITING DECOMPOSITION TIME ON A PER PAGE BASIS FOR OUTPUT DEVICES

TECHNICAL FIELD

The present invention relates generally to output devices and more particularly to limiting decomposition time on a per page basis for output devices.

BACKGROUND OF THE INVENTION

FIG. 1 depicts a typical data flow for a printing operation and a conventional computer system 10. In particular, the computer system 10 submits a page 12 to a printer 14. The page 12 is encoded in a page description language, such as Postscript or Printer Control Language (PCL). The printer 14 includes the intelligence for generating a printed page from the page 12 encoded in the page description language. Specifically, the printer 14 receives the page 12 and passes the page through an interpreter 16 (such as a Postscript interpreter or a PCL interpreter). The interpreter 16 interprets the encoded page 12 to produce a printed page on the printer 14. The processing of the page 12 to produce the printed output is known as "decomposition."

Printing tasks are typically organized into "print jobs." For example, a word processing document may include multiple pages. When the user wishes to print the word processing document, the user submits a print job to the printer 14, where the print job includes all of the pages of the document. As shown in FIG. 2, a print job 20 may contain encoded pages 24 that are sequentially printed. Each encoded page 26 passes separately through the interpreter 16 to produce a printed page 30. Unfortunately, for a number of different reasons, it may take an inordinate amount of time for certain pages to decompose. As a result, the printer is monopolized by a single print job. Given that printers are typically shared resources, the monopolization of the printer by a single print job is problematic, resulting in the starvation of all of the waiting print jobs.

SUMMARY OF THE INVENTION

The present invention addresses the above-described problems with conventional printers. The present invention allows a user of an output device, such as a printer, to specify a maximum permissible decomposition time for a page. If any page of a print job is not fully decomposed by the time the maximum decomposition time is reached, the job may be terminated. In addition, one or more notifications may be sent to the user of the output device. This approach is especially well adapted for use with printers.

In accordance with one aspect of the present invention, a printer is provided for printing a print job that has at least one page. The printer includes an interface for permitting an operator to specify a maximum decomposition time that is permitted per page for the print job. The printer also includes a timer for calculating decomposition times for each page of the print job. A comparator is included in the printer for comparing the calculated decomposition times for each of the pages of the print job with a maximum decomposition time to determine whether any of the calculated decomposition times exceed the maximum decomposition time. The printer may include termination logic for terminating the print job when the comparator determines that at least one of the calculated decomposition times exceeds the maximum decomposition time. The printer may also include a notification module for producing a notification when one of the calculated decomposition times exceeds the maximum decomposition time.

In accordance with another aspect of the present invention, a job is provided in an output device where the job has at least one page. Decomposition times for the pages of the job are monitored. The job is terminated when at least one of the pages in the job has a decomposition time that exceeds a user-established maximum decomposition time.

In accordance with a further aspect of the present invention, the first and second user-chosen maximum decomposition times are established. For a selected print job, a determination is made as to which of the user-chosen maximum decomposition times to apply. The determined user-chosen maximum decomposition time is used in monitoring the selected print job to determine whether any of the pages of the selected print job take longer than the determined maximum decomposition time to decompose.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention allows a user to select a maximum decomposition time that is permissible for a page of a print job. If any page in a print job exceeds the maximum decomposition time, an event may be triggered. For example, the print job may be terminated and/or notifications may be generated. The notifications may advise the user that one of the pages of the print job has exceeded the maximum decomposition time. The notifications may be email messages, facsimile messages, printed messages, pages or other varieties of communications. It should also be appreciated that events other than the termination of the print job or the generation of the notification may be triggered by a page in the print job exceeding the maximum decomposition time.

The illustrative embodiment is implemented on a printer that provides a user with a user interface for selecting the maximum decomposition time. In some embodiments, the user may be able to select multiple maximum decomposition times. Each decomposition time is associated with one or more scenarios, such as which paper tray is used to print, type of print job and the like.

Figure 1:
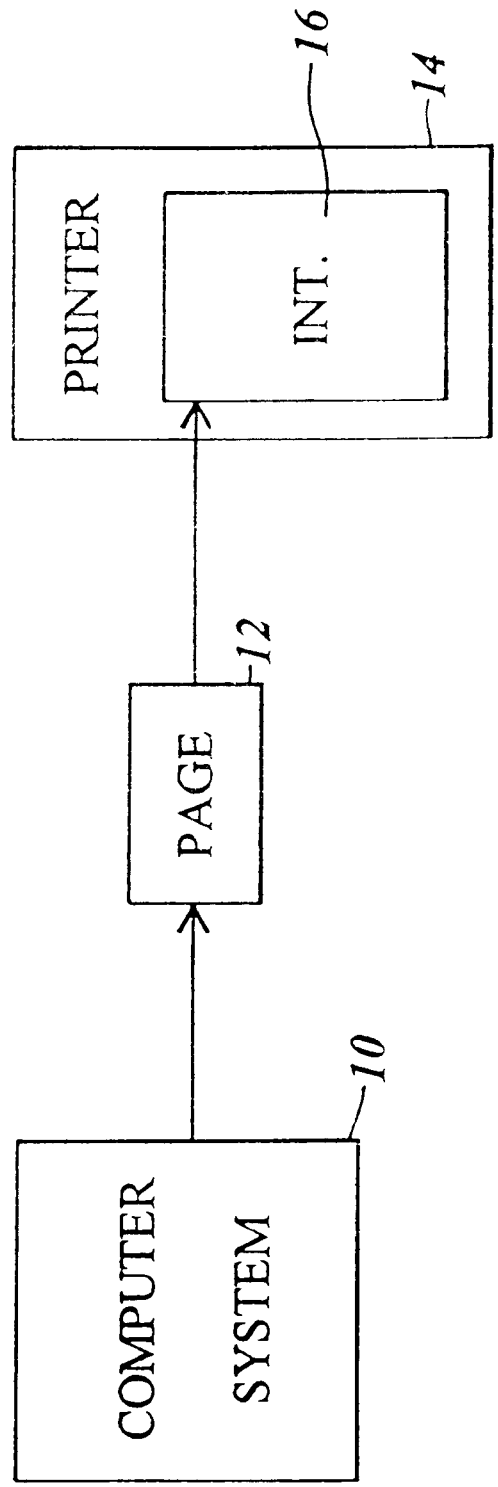
FIG. 1 depicts data flow between a conventional computer system and a printer.
Figure 2:
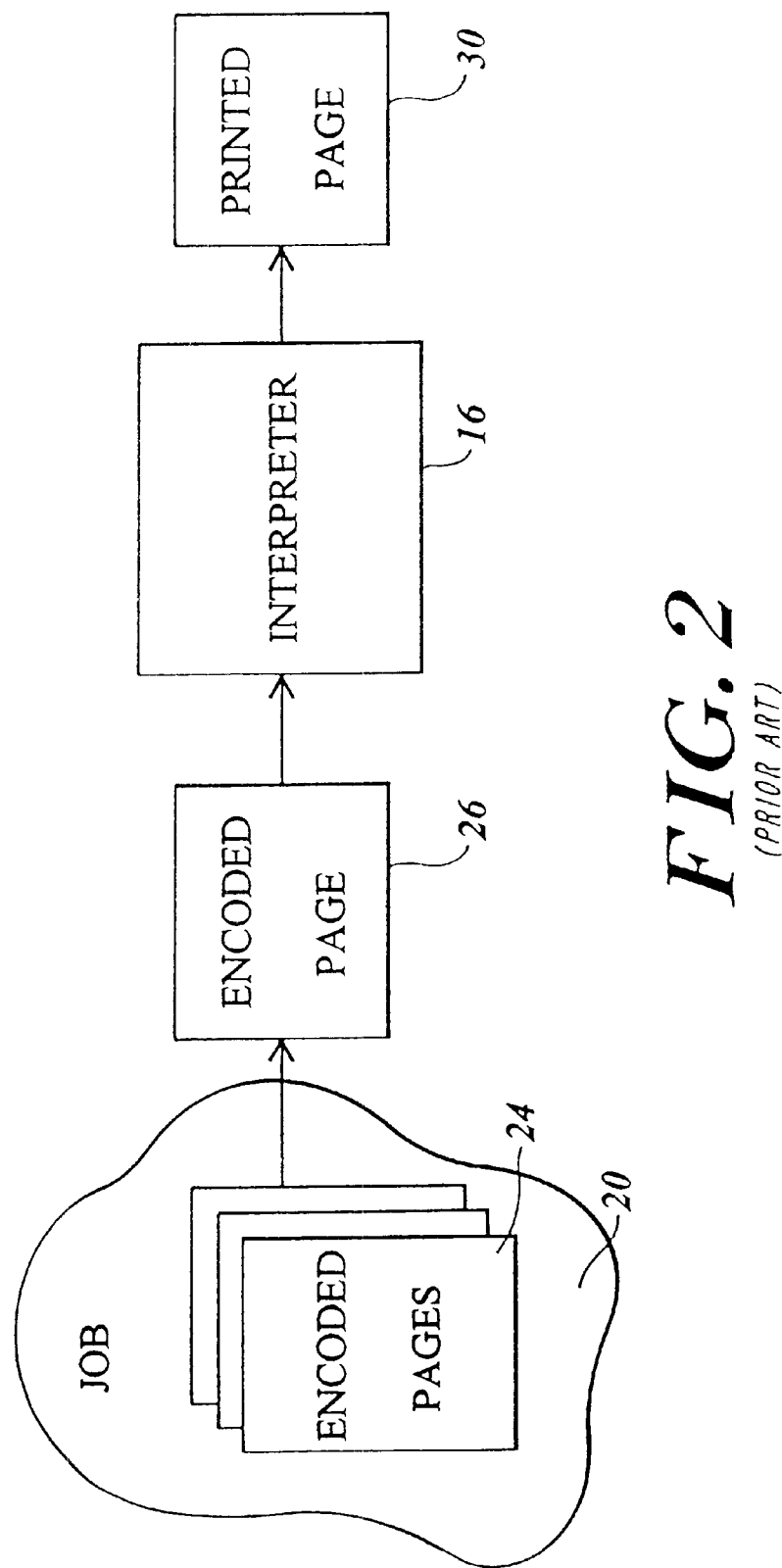
FIG. 2 depicts the processing of a conventional print job.
Figure 3:
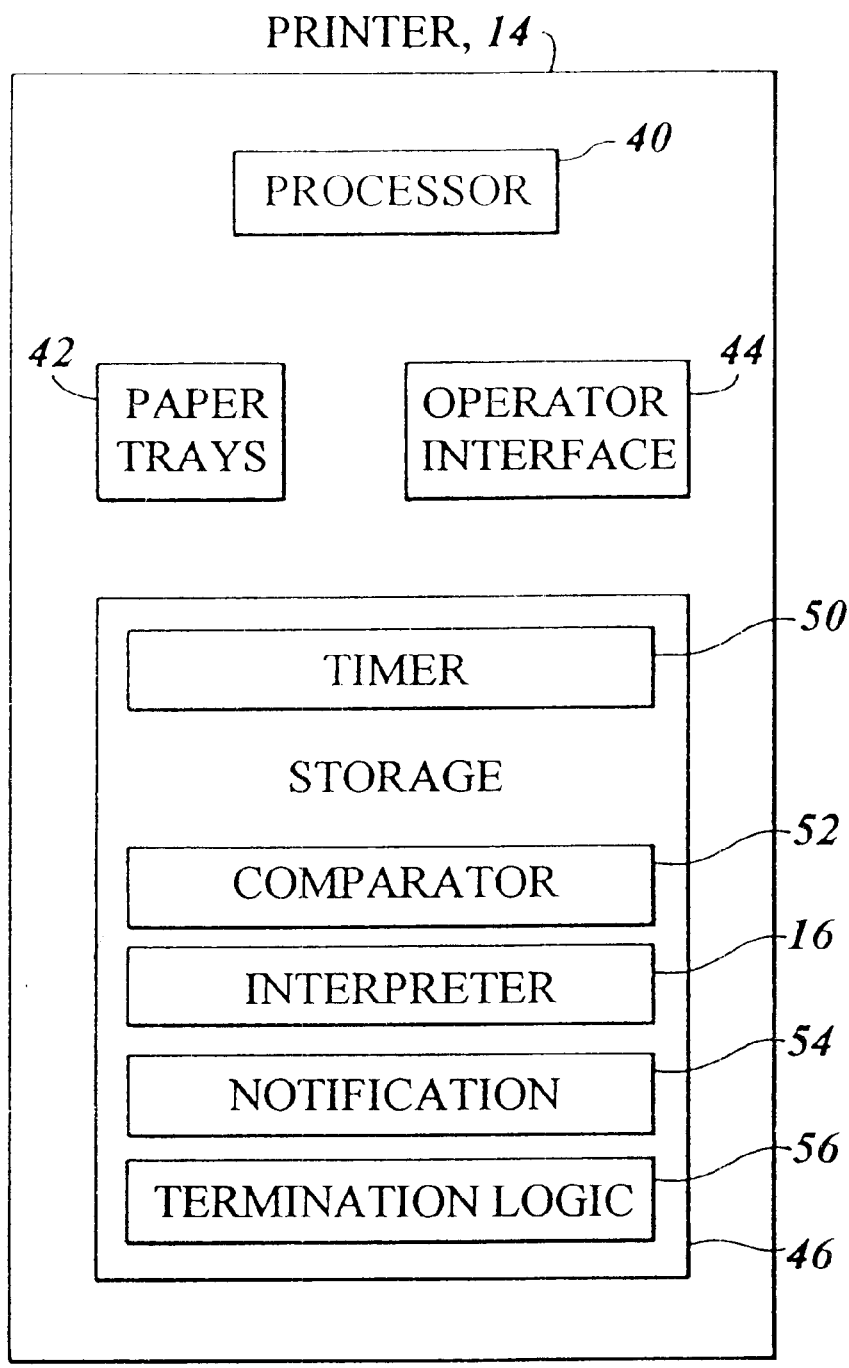
FIG. 3 depicts logical components of a printer in the illustrative embodiment of the present invention.

FIG. 3 depicts a block diagram of the logical organization of printer 14 for use in the illustrative embodiment of the present invention. The printer includes a processor 40 for executing instructions. The processor 40 may be realized as a controller, or as a general purpose microprocessor. Those skilled in the art will appreciate that a number of different types of commercially available processors may be used within the printer 14. The printer 14 includes one or more paper trays 42 for holding paper on which output is to be printed by the printer 14. The paper trays 42 may include but are not limited to a letter-size paper tray, a legal-size paper tray, an A4-size paper tray, and an 11×17 paper tray. The printer 14 also includes an operator interface 44 that allows the operator of the printer to communicate with the printer. The operator interface 44 serves as the mechanism by which the operator selects a maximum decomposition time in the illustrative embodiment.

The printer 14 includes storage 46. The storage 46 may include both primary storage and secondary storage. Moreover, those skilled in the art will appreciate that the storage 46 may be implemented using a number of different types of storage technologies, including but not limited to RAM, ROM, EEROM, EPROM, magnetic disks, optical disks, and removable media, such as floppy disks or CD-ROMs. The storage 46 holds instructions for realizing a timer 50. These instructions are executed by the processor 40 when the timer 50 is active. The role of the timer 50 will be discussed in more detail below. A storage 46 also holds instructions for a comparator 52 that compares the decomposition time for each page of a print job with the maximum decomposition time. It is presumed that the comparator 52 maintains data regarding the maximum decomposition time chosen by an operator (i.e. user) and current decomposition time as calculated by the timer 50. A notification module 54 is stored in the storage 46 to generate notifications, such as emails, facsimiles, printed output, pages or other types of application. The storage 46 additionally holds termination logic 56 for terminating a print job when instructed by the comparator 52. The storage holds an interpreter 16 for interpreting a page description language, such as Postscript, PJL or PCL. Those skilled in the art will appreciate that the storage 46 may include multiple interpreters. Those skilled in the art will also appreciate that the timer 50, comparator 52 and notification module 54 may all be implemented as part of a common software package or as separate modules.

Figure 4:
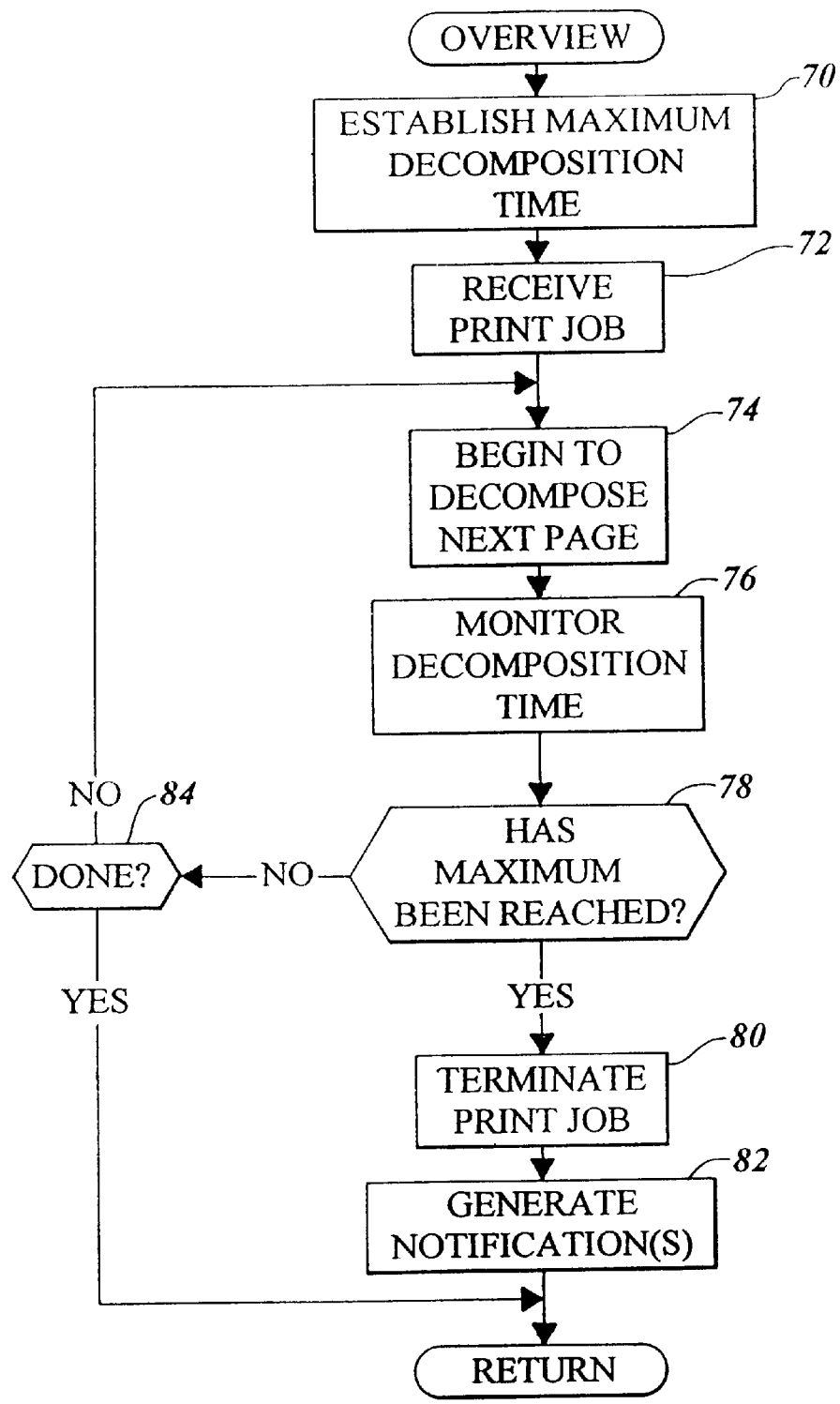
FIG. 4 is a flow chart illustrating the steps that are performed to limit the decomposition times in the illustrative embodiment.
Figure 5A:
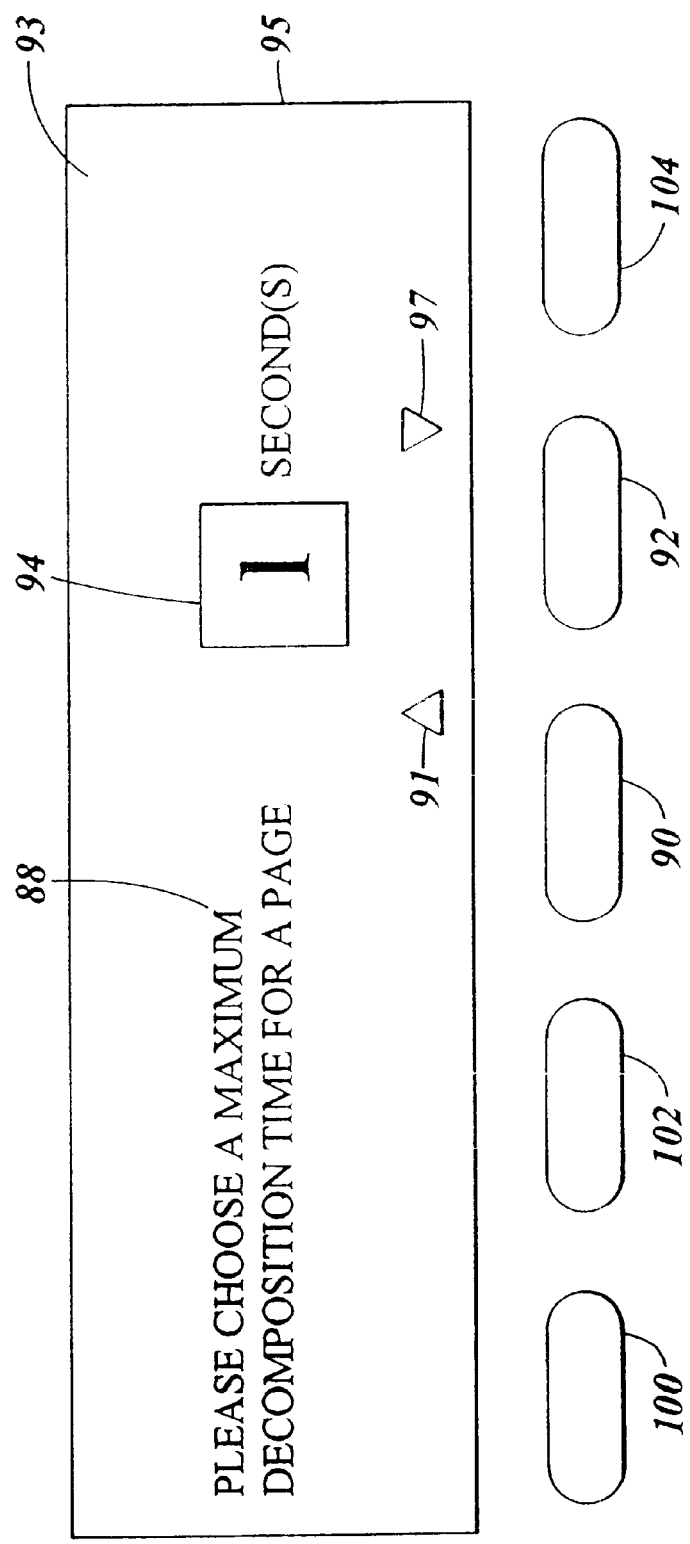
FIG. 5A illustrates an interface that may be used by a user to select a maximum decomposition time for a page of a print job.

FIG. 4 is a flow chart illustrating how a maximum decomposition time is established and used in the illustrative embodiment of the present invention. Initially a maximum decomposition time is established (step 70 in FIG. 4). In the illustrative embodiment, the maximum decomposition time is selected by an operator. The operator interface 44 is used to select such a maximum decomposition time. FIG. 5A shows a first example of an operator interface 44 that may be used to select a maximum decomposition time. An operator may select menu and options via pushbuttons 90, 92, 100, 102 and 104 to obtain a screen 93 on a display 95. The display 95 may be, for example, a liquid crystal display (LCD), such as commonly found with commercially available printers. The screen 93 includes text 88 that prompts the operator to choose a maximum decomposition time for a page. A text box 94 contains a current value for the maximum decomposition time. In the example shown in FIG. 5A, a value of "1" second is displayed in box 94. The screen 93 also contains an up arrow 91 indicating that pushbutton 90 may be used to increment the value displayed in box 94. Similarly, the screen 93 contains a down arrow 97 indicating that pushbutton 92 may be used to decrement the value displayed in box 94. Each activation of pushbutton 92 increments the value by one second, whereas each activation of the pushbutton 92 decrements the value in box 94 by one second. The printer 14 may limit the values that are chosen such that there are minimum selectable values and maximum selectable values.

Figure 5B:
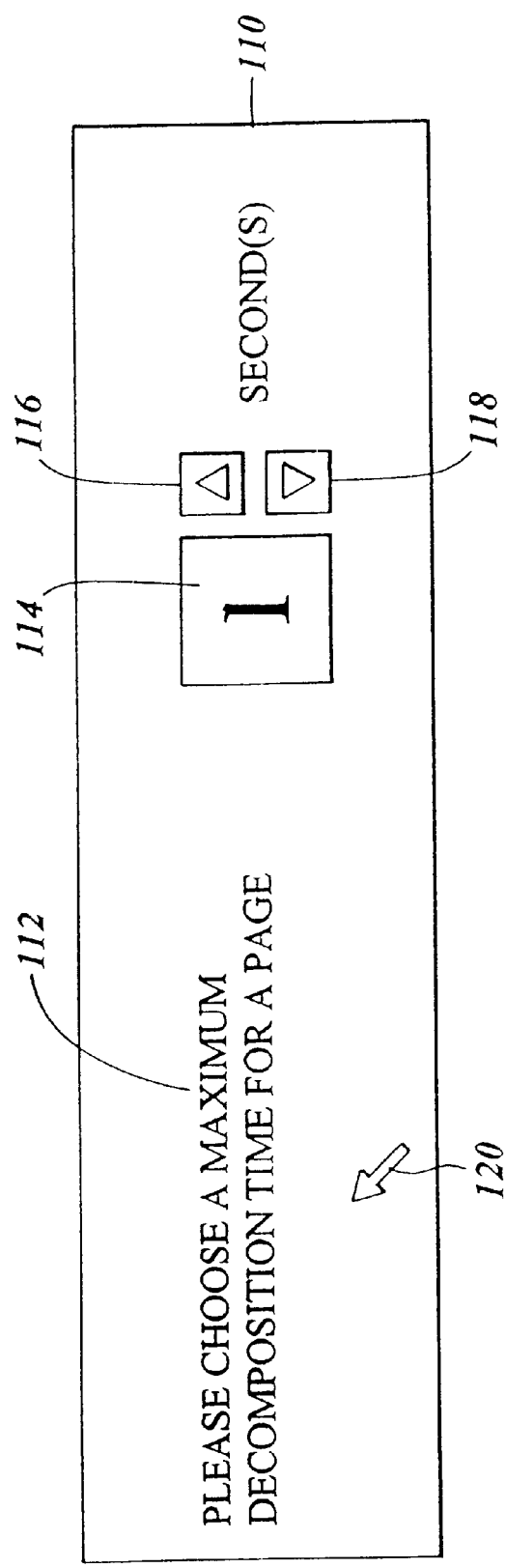
FIG. 5B illustrates an alternative user interface for selecting a maximum decomposition time.

FIG. 5B depicts an alternative interface in which the display 110 is more akin to a conventional computer screen and contains a cursor 120. The display 110 prompts the operator to select the maximum decomposition time and includes a text box 114 that displays a current value for the maximum decomposition time. Button controls 116 and 118 are displayed within the display 110 and may be activated by positioning the cursor 120 at the buttons and activating the pointing device (such as by clicking a mouse button) to increment or decrement the values. Button 116 increments the value of the maximum decomposition time and button 118 decrements the value of the maximum decomposition time.

Those skilled in the art will appreciate that other types of interfaces may be used to select the maximum decomposition time. The interfaces shown in FIGS. 5A and 5B are intended to be merely illustrative and not limiting of the present invention. Further, programmatic interfaces may be provided to enable the operator to programmatically select the maximum decomposition time. Still further, those skilled in the art will appreciate that the printer depicted in FIG. 3 is intended to be merely illustrative. Different components and additional components may be included as part of the printer 14 in practicing the present invention.

After the maximum decomposition time has been established (step 70 in FIG. 4), the storage 46 holds a copy of the maximum decomposition time for use by the comparator 52. Subsequently, a print job is received at the printer 14 (step 72 in FIG. 4). The print job may include one or more pages, and each of the pages will be decomposed sequentially. Thus, the printer 14 begins to decompose the next page in the print job using the interpreter 16 (step 74 in FIG. 4). The timer 50 monitors the decomposition time for the page (step 76 in FIG. 4). As used herein, "decomposition time" refers to the time it takes a page to decompose. The decomposition of the page entails interpreting an encoded representation of a page (in a page description language) to produce printed output.

The comparator 52 determines whether the maximum decomposition time has been reached for the page (see step 78 in FIG. 4). If the maximum decomposition time has been reached and the page is not fully decomposed, additional steps must be taken. If, however, the page has already been fully decomposed before the maximum decomposition time is reached, the next page may be processed. Specifically, the printer 14 checks whether there are any pages left to be processed on the current print job (step 84 in FIG. 4), if there are additional pages (i.e. the processing is not "done"), the process repeats itself beginning at step 74 of FIG. 4.

Figure 6:
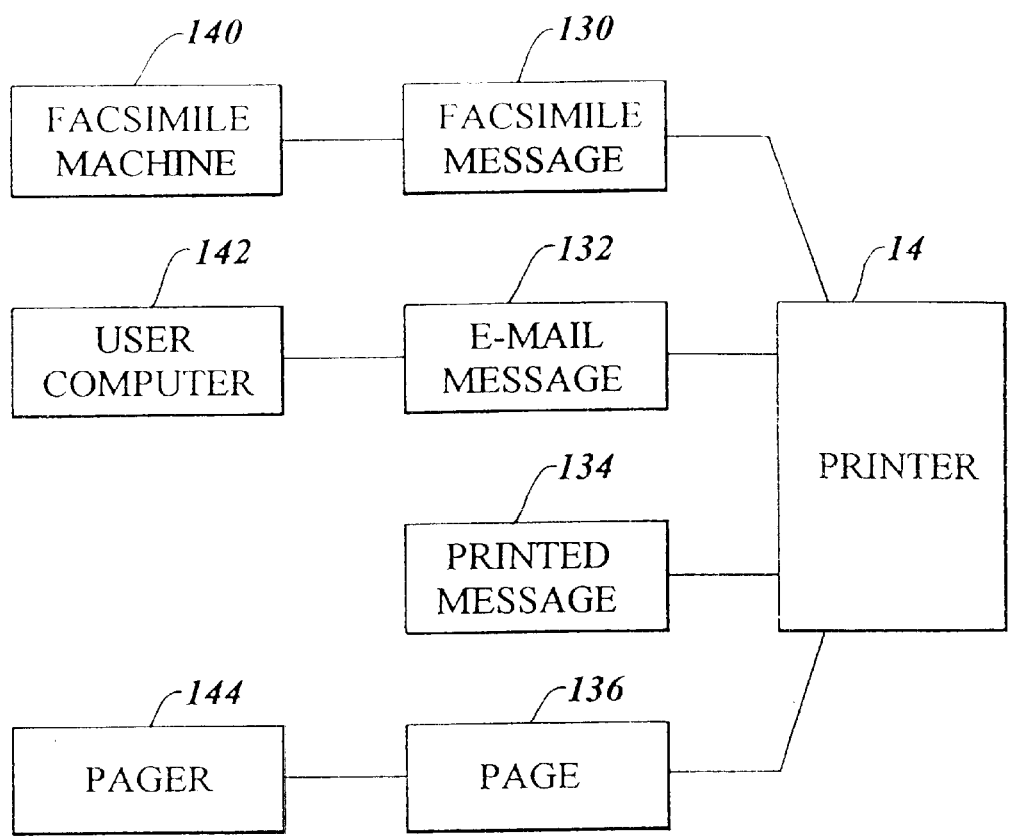
FIG. 6 illustrates a number of alternative notifications that may be generated in the illustrative embodiment.

In instances wherein the maximum decomposition time has been reached (see step 78 in FIG. 4), the print job is terminated (step 80 in FIG. 5). The termination of the print job causes no more pages of the print job to be output on the printer 14. The printer 14 contains termination logic 56 for generating such a termination. In the illustrative embodiment, one or more notifications are then generated to advise the operator that one of the pages did not fully decompose before the maximum decomposition time is reached (step 82 in FIG. 4). The notifications may take many different forms. As shown in FIG. 6, the printer 14 may generate a facsimile message 130 for output on a facsimile machine 140 or a computer system that is capable of receiving facsimile messages. The facsimile message 130 advises the operator that the print job has failed due to one of the pages exceeding the maximum decomposition time. A notification may also be an email message 132 that is sent to a user computer 142. Furthermore, the notification may be simply a printed message 134 that is output by the printer 14. Still further, the notification may be a page 136 that is sent to a pager 144.

Those skilled in the art will appreciate that other varieties of communications may be utilized to perform the notification. For example, video mail messages or voice mail messages may be forwarded to an operator to advise the operator of the termination of the print job.

As mentioned above, more than one maximum decomposition time may be established by an operator. In some environments, it may make sense to establish multiple maximum decomposition times. Each of the maximum decomposition times is associated with a-given scenario, where a scenario represents a particular printing situation.

Figure 7:
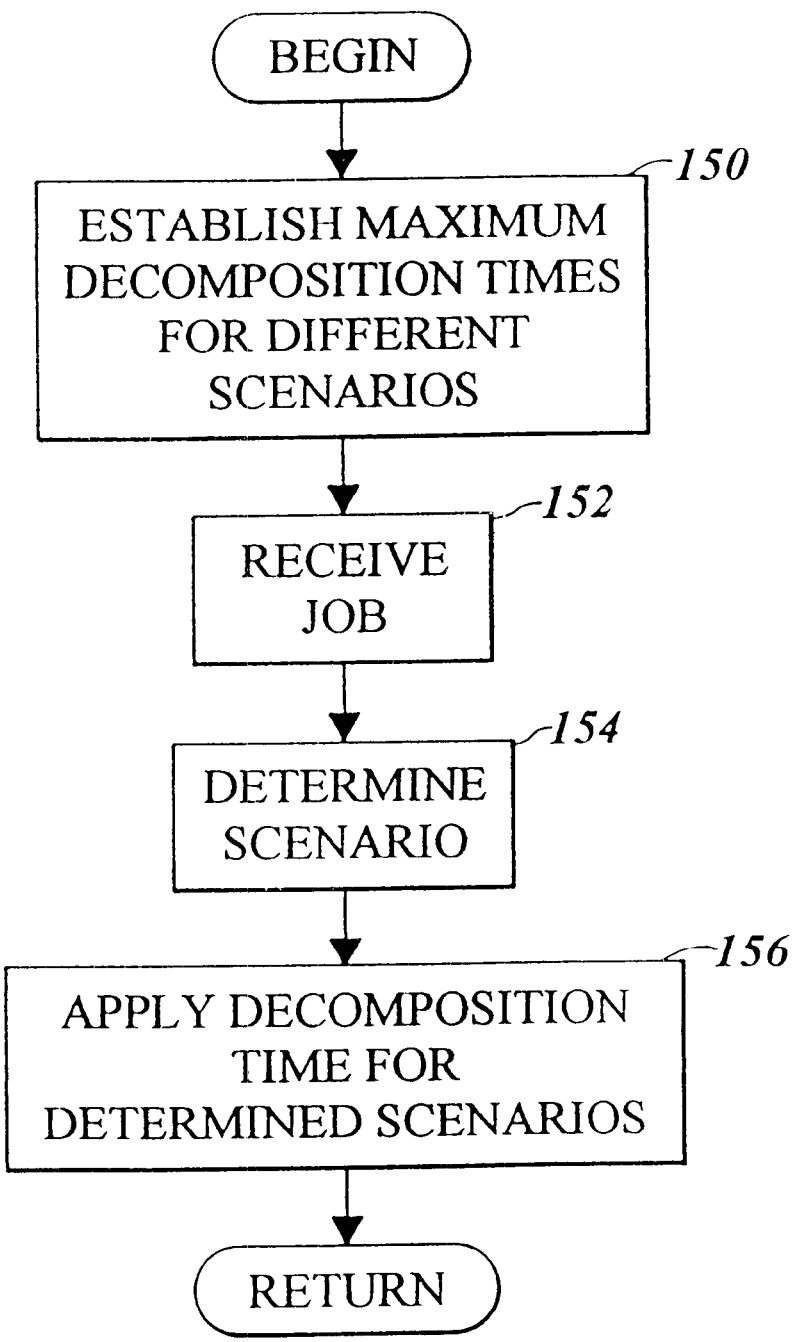
FIG. 7 is a flow chart illustrating the steps that are performed to determine which of multiple maximum decomposition times is to be applied for a given print job.

FIG. 7 is a flow chart that depicts the steps that are utilized when multiple maximum decomposition times are used. Initially, the maximum decomposition times are established for different scenarios (step 150 in FIG. 7). For instance, each paper tray may have a different maximum decomposition time; thus, a printing scenario for each paper tray is established and has an associated maximum decomposition time. The print job is received at the printer 14 (step 152 in FIG. 7). Based on how the print job is to be printed, it is determined what scenario is appropriate for the print job (step 154 in FIG. 7). For example, suppose that a print job is to be printed on paper tray 2. Paper tray 2 print jobs employ a specified maximum decomposition time. Hence, the specified maximum decomposition time is used when printing the received print job using paper from paper tray 2. Those skilled in the art will also appreciate that different scenarios based upon characteristics of the print job load on the printer and the like may constitute separate scenarios with separate associated maximum decomposition time. The determined decomposition time is then applied when the print job is printed (step 156 in FIG. 7). The next steps performed are then like those described above relative to FIG. 4.

The illustrative embodiment avoids the monopolization of printer 14 by any print job. Hence, it is less likely that any print jobs will starve due to the monopolization of the printer. In addition, the illustrative embodiment increases the throughput of print jobs through the printer by ensuring that print jobs do not take an inordinate amount of time to print.

While the present invention has been described with reference to an illustrative embodiment thereof, those skilled in the art will appreciate that various changes in form and detail may be made without departing from the intended scope of the present invention as defined in the appended claims.

What is claimed is:

1. A printer for printing a print job having at least one page, comprising:
   an interface for permitting an operator to specify a maximum decomposition time that is permitted per page for the print job;
   a timer for calculating decomposition times for each of the pages of the print job; and
   a comparator for comparing each of the calculated decomposition times for each of the pages of the print job with the maximum decomposition time to determine whether any of the calculated decomposition times exceed the maximum decomposition time.

2. The printer of claim 1 further comprising termination logic for terminating the print job when the comparator determines that at least one of the calculated decomposition times exceeds the maximum decomposition time.

3. The printer of claim 2 further comprising a notification module for producing a notification when one of the calculated decomposition times exceeds the maximum decomposition time.

4. The printer of claim 1 further comprising a notification module for producing a notification when one of the calculated decomposition times exceeds the maximum decomposition time.

5. The printer of claim 4 wherein the notification module produces an electronic mail message as the notification.

6. The printer of claim 4 wherein the notification module produces a printed message as the notification.

7. The printer of claim 1 further comprising a processor and wherein the timer and comparator comprise instructions that are executed by the processor.

8. The printer of claim 1 wherein the interface permits the operator to change the maximum decomposition time.

9. In an output device that outputs jobs, a method, comprising the steps of:
   providing a job having at least one page;
   as the pages in the job are decomposed, monitoring decomposition times for each of the pages of the job; and
   where at least one of the pages in the job has a decomposition time that exceeds a user-established maximum decomposition time, terminating the job.

10. The method of claim 9 further comprising the step of generating a notification indicating that at least one of the pages in the job has a decomposition time that exceeds the user-established maximum decomposition time.

11. The method of claim 10 wherein the generating of the notification comprises generating a printed message.

12. The method of claim 10 wherein the generating of the notification comprises generating an electronic message.

13. The method of claim 9 wherein the method further comprises the step of establishing the user-established maximum decomposition time by interacting with a user.

14. The method of claim 9 wherein the output device is a printer.

15. The method of claim 9 wherein the output device includes a processor and wherein the monitoring of decomposition times comprises executing instructions on the processor for performing the monitoring.

16. In a printer, a method, comprising the steps of:
   establishing a first user-chosen maximum decomposition time for a page of a print job to decompose;
   establishing a second user-chosen maximum decomposition time for a page of a print job to decompose;
   determining which of the first user-chosen maximum decomposition time and the second user-chosen maximum decomposition time to apply to the selected print job; and
   monitoring decomposition of the selected print job to determine whether any of the pages of the selected print job take longer than the determined maximum decomposition time to decompose.

17. The method of claim 16 wherein the printer contains multiple paper trays and wherein the determining step determines which of the maximum decomposition times to apply based on which of the paper trays is to be used for printing the selected print job.

18. In an output device having a processor for executing instructions, a medium for holding instructions for execution on the processor for performing a method, comprising the steps of:

establishing a maximum decomposition time for any page of a job on the output device based on input from a user;

calculating a decomposition time for each page of the job as the job is being output on the output device; and determining when the calculated decomposition time for one of the pages of the print job exceeds the maximum decomposition time.

19. The medium of claim 18 wherein the medium also holds instructions for terminating the job when it is determined that the calculated decomposition time for one of the pages of the print job exceeds the maximum decomposition time.

20. The medium of claim 18 wherein the medium also holds instruction for generating a notification to the user when it is determined that the calculated decomposition time for one of the pages of the print job exceeds the maximum decomposition time.

* * * * *